United States Patent [19]
Micali

[11] Patent Number: 5,276,737
[45] Date of Patent: Jan. 4, 1994

[54] FAIR CRYPTOSYSTEMS AND METHODS OF USE

[76] Inventor: Silvio Micali, 224 Upland Rd., Cambridge, Mass. 02140

[21] Appl. No.: 870,935

[22] Filed: Apr. 20, 1992

[51] Int. Cl.$^5$ ............................................... H04K 1/00
[52] U.S. Cl. ........................................ 380/30; 380/23; 380/25
[58] Field of Search ..................... 380/23, 24, 25, 28, 380/29, 30

[56] References Cited

U.S. PATENT DOCUMENTS

| | | | |
|---|---|---|---|
| 4,375,579 | 3/1983 | Davida et al. | 380/28 |
| 4,933,970 | 6/1990 | Shamir | 380/30 |
| 5,005,200 | 4/1991 | Fischer | 380/30 |
| 5,018,196 | 5/1991 | Takaragi et al. | 380/30 |
| 5,136,643 | 8/1992 | Fischer | 380/23 |
| 5,150,411 | 9/1992 | Maurer | 380/30 |

*Primary Examiner*—Tod R. Swann
*Attorney, Agent, or Firm*—David H. Judson

[57] ABSTRACT

A method, using a public-key cryptosystem, for enabling a predetermined entity to monitor communications of users suspected of unlawful activities while protecting the privacy of law-abiding users, wherein each user is assigned a pair of matching secret and public keys. According to the method, each user's secret key is broken into shares. Then, each user provides a plurality of "trustees" pieces of information. The pieces of information provided to each trustee enable that trustee to verify that such information includes a "share" of a secret key of some given public key. Each trustee can verify that the pieces of information provided include a share of the secret key without interaction with any other trustee or by sending messages to the user. Upon a predetermined request or condition, e.g., a court order authorizing the entity to monitor the communications of a user suspected of unlawful activity, the trustees reveal to the entity the shares of the secret key of such user. This enables the entity to reconstruct the secret key and monitor the suspect user's communications.

18 Claims, 1 Drawing Sheet

FAIR CRYPTOSYSTEMS AND METHODS OF USE

TECHNICAL FIELD

The present invention relates generally to cryptosystems and more particularly to methods for enabling a given entity to monitor communications of users suspected of unlawful activities while protecting the privacy of law-abiding users.

BACKGROUND OF THE INVENTION

In a single-key cryptosystem a common secret key is used both to encrypt and decrypt messages. Thus only two parties who have safely exchanged such a key beforehand can use these systems for private communication. This severely limits the applicability of single-key systems.

In a double-key cryptosystem, the process of encrypting and decrypting is instead governed by different keys. In essence, one comes up with a pair of matching encryption and decryption keys. What is encrypted using a given encryption key can only be decrypted using the corresponding decryption key. Moreover, the encryption key does not "betray" its matching decryption key. That is, knowledge of the encryption key does not help to find out the value of the decryption key. The advantage of double-key systems is that they can allow two parties who have never safely exchanged any key to privately communicate over an insecure communication line (i.e., one that may be tapped by an adversary). They do this by executing an on-line, private communication protocol.

In particular, Party A alerts Party B that he wants to talk to him privately. Party B then computes a pair of matching encryption and decryption keys ($E_B$, $D_B$). B then sends A key $E_B$. Party A now encrypts his message m, obtaining the ciphertext $c = E_B(m)$, and sends c to B over the insecure channel. B decrypts the ciphertext by computing $m = D_B(c)$. If an adversary eavesdrops all communication between A and B, he will then hear both B's encryption key, $E_B$, and A's ciphertext, c. However, since the adversary does not know B's decryption key, $D_B$, he cannot compute m from c.

The utility of the above protocol is still quite limited since it suffers from two drawbacks. First, for A to send a private message to B it is necessary also that B send a message to A, at least the first time. In some situations this is a real disadvantage. Moreover, A has no guarantee (since the line is insecure anyway) that the received string $D_B$ really is B's encryption key. Indeed, it may be a key sent by an adversary, who will then understand the subsequent, encrypted transmission.

An ordinary public-key cryptosystem ("PKC") solves both difficulties and greatly facilitates communication. Such a system essentially consists of using a double-key system in conjunction with a proper key management center. Each user X comes up with a pair of matching encryption and decryption keys ($E_X$, $D_X$) of a double-key system. He keeps $D_X$ for himself and gives $E_X$ to the key management center. The center is responsible for updating and publicizing a directory of correct public keys for each user, that is, a correct list of entries of the type (X, $E_X$). For instance, upon receiving the request from X to have $E_X$ as his public key, the center properly checks X's identity, and (digitally) signs the pair (X, $E_X$), together with the current date if every encryption key has a limited validity. The center publicizes $E_X$ by distributing the signed information to all users in the system. This way, without any interaction, users can send each other private messages via their public, encryption key that they can look up in the directory published by the center. The identity problem is also solved, since the center's signature of the pair (X, $E_X$) guarantees that the pair has been distributed by the center, which has already checked X's identity.

The convenience of a PKC depends on the key management center. Because setting up such a center on a grand scale requires a great deal of effort, the precise protocols to be followed must be properly chosen. Moreover, public-key cryptography has certain disadvantages. A main disadvantage is that any such system can be abused, for example, by terrorists and criminal organizations who can use their own PKC (without knowledge of the authorities) and thus conduct their illegal business with great secrecy and yet with extreme convenience.

It would therefore be desirable to prevent any abuse of a public key cryptosystem while maintaining all of its lawful advantages.

BRIEF SUMMARY OF THE INVENTION

It is an object of the present invention to provide methods for enabling a given entity, such as the government, to monitor communications of users suspected of unlawful activities while at the same time protecting the privacy of law-abiding users.

It is a further object of the invention to provide such methods using either public or private key cryptosystems.

It is a still further object of the invention to provide so-called "fair" cryptosystems wherein an entity can monitor communications of suspect users only upon predetermined occurrences, e.g., the obtaining of a court order.

It is another object to describe methods of constructing fair cryptosystems for use in such communications techniques.

In one embodiment, these and other objects of the invention are provided in a method, using a public-key cryptosystem, for enabling a predetermined entity to monitor communications of users suspected of unlawful activities while protecting the privacy of law-abiding users, wherein each user is assigned a pair of matching secret and public keys. According to the method, each user's secret key is broken into shares. Then, each user provides a plurality of "trustees" pieces of information. The pieces of information provided to each trustee enable that trustee to verify that such information includes a "share" of a secret key of some given public key. Further, each trustee can verify that the pieces of information provided include a share of the secret key without interaction with any other trustee or by sending messages to the user. Upon a predetermined request or condition, e.g., a court order authorizing the entity to monitor the communications of a user suspected of unlawful activity, the trustees reveal to the entity the shares of the secret key of such user to enable the entity to reconstruct the secret key and monitor the suspect user's communications.

The method can be carried out whether or not the identity of the suspect user is known to the trustees, and even if less than all of the shares of the suspect user's secret key are required to be revealed in order to reconstruct the secret key. The method is robust enough to be effective if a given minority of trustees have been compromised and cannot be trusted to cooperate with the entity. In addition, the suspect user's activities are characterized as unlawful if the entity, after reconstructing or having tried to reconstruct the secret key, is still unable to monitor the suspect user's communications.

According to another more generalized aspect of the invention, a method is described for using a public-key cryptosystem for enabling a predetermined entity to monitor communications of users suspected of unlawful activities while protecting the privacy of law-abiding users. The method comprises the step of "verifiably secret sharing" each user's secret key with a plurality of trustees so that each trustee can verify that the share received is part of a secret key of some public key.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
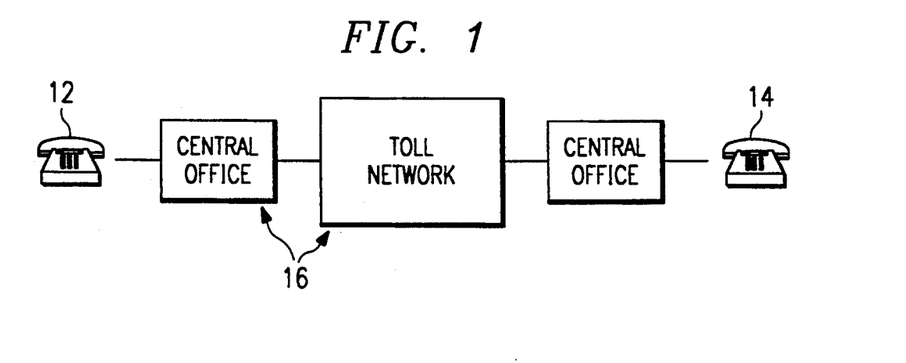
FIG. 1 is a simplified diagram of a communications system over which a government entity desires to monitor communications of users suspected of unlawful activities.
Figure 2:
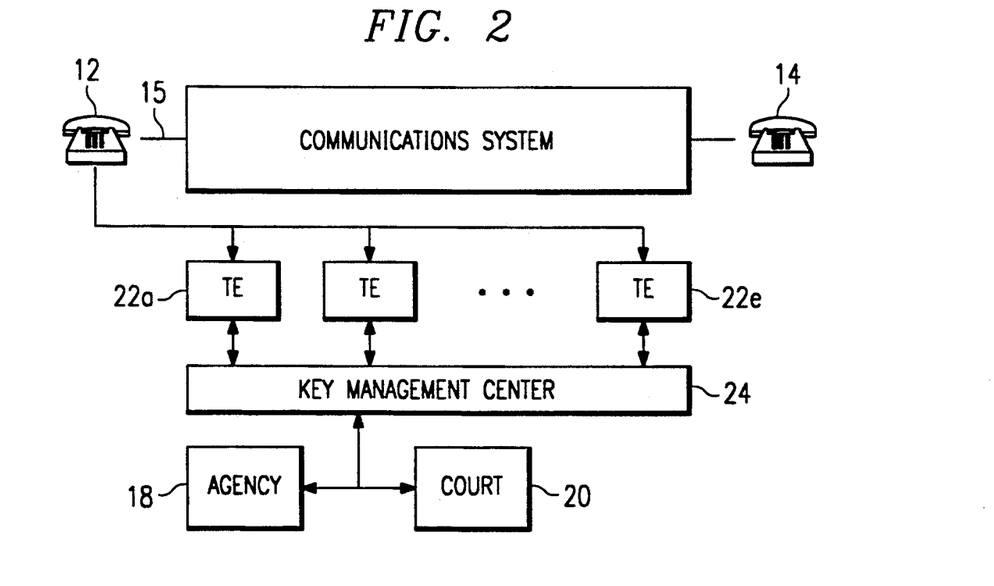
FIG. 2 is a block diagram of a preferred hierarchy of entities that may use the methods of the present invention to monitor communications of users suspected of unlawful activities.

FIG. 1 represents a simple communications system 10 comprising a telephone network connected between a calling station 12 and a called station 14. One or more local central offices or telephone switches 16 connect telephone signals over the network in a well-known fashion. Referring now also to FIG. 2, assume that a government entity, such as local law enforcement agency 18, desires to monitor communications to and/or from calling station 12 because the user of such calling station is suspected of unlawful activity. Assume further that the user of the calling station 12 communicates using a PKC. Following accepted legal practices, the agency 18 obtains a court order from court 20 to privately monitor the line 15. According to the present invention, the agency's is able to monitor the line 15 while at the same time the privacy rights of other law-abiding users of the network are maintained. This is accomplished as will be described by requiring that each user "secret share" the user's secret key (of the PKC) with a plurality of trustees 22a ... 22n.

According to the invention, a "fair" PKC is a special type of public-key cryptosystem. Every user can still choose his own keys and keep secret his private one; nonetheless, a special agreed-upon party (e.g., the government), and solely this party, under the proper circumstances envisaged by the law (e.g., a court order), and solely under these circumstances, is authorized to monitor all messages sent to a specific user. A fair PKC improves the security of the existing communication systems (e.g., the telephone service 10) while remaining within the constraints of accepted legal procedures.

In one embodiment, fair PKC's are constructed in the following general way. Referring now to FIGS. 1-2, it is assumed that there are five (5) trustees 22a ... 22e and that the government desires, upon receiving a court order, to monitor the telephone communications to or from the calling station 12. Although the above-description is specific, it should be appreciated that users of the communications system and trustees may be people or computing devices. It is preferable that the trustees are chosen to be trustworthy. For instance, they may be judges (or computers controlled by them), or computers specially set up for this purpose. The trustees, together with the individual users, play a crucial role in deciding which encryption keys will be published in the system.

Each user independently chooses his own public and secret keys according to a given double-key system (for instance, the public key consists of the product of two primes, and the secret key one of these two primes). Since the user has chosen both of his keys, he can be sure of their "quality" and of the privacy of his decryption key. He then breaks his secret decryption key into five special "pieces" (i.e., he computes from his decryption key 5 special strings/numbers) possessing the following properties:

(1) The private key can be reconstructed given knowledge of all five, special pieces;
(2) The private key cannot be guessed at all if one only knows (any) 4, or less, of the special pieces;
(3) For i-1, ... 5, the i-th special piece can be individually verified to be correct.

Given all 5 special pieces or "shares", one can verify that they are correct by checking that they indeed yield the private decryption key. According to one feature of the invention, property (3) insures that each special piece can be verified to be correct (i.e., that together with the other 4 special pieces it yields the private key) individually, i.e., without knowing the secret key at all and without knowing the value of any of the other special pieces.

The user then privately (e.g., in encrypted form) gives trustee 22i his own public key and the i-th piece of its associated secret key. Each trustee 22 individually inspects his received piece, and, if it is correct, approves the public key (e.g. signs it) and safely stores the piece relative to it. These approvals are given to a key management center 24, either directly by the trustees, or (possibly in a single message) by the individual user who collects them from the trustees. The center 24, which may or may not coincide with the government, itself approves (e.g., signs) any public key that is approved by all trustees. These center-approved keys are the public keys of the fair PKC and they are distributed and used for private communication as in an ordinary PKC.

Because the special pieces of each decryption key are privately given to the trustees, an adversary who taps the communication line of two users possesses the same information as in the underlying, ordinary PKC. Thus if the underlying PKC is secure, so is the fair PKC. Moreover, even if the adversary were one of the trustees himself, or even a cooperating collection of any four out of five of the trustees, property (2) insures that the adversary would still have the same information as in the ordinary PKC. Because the possibility that an adversary corrupts five out of five judges is absolutely remote, the security of the resulting fair PKC is the same as in the underlying PKC.

When presented with a court order, for example, the trustees 22 reveal to the government 20 the pieces of a given decryption key in their possession. According to the invention, the trustees may or may not be aware of the identity of the user who possesses the given decryption key. This provides additional security against "compromised" trustees who might otherwise tip off the suspect user once a request for that user's decryption key share is received by the trustee.

Upon receiving the shares, the government reconstructs the given decryption key. By property (3), each trustee previously verified whether he was given a correct special piece of a given decryption key. Moreover, every public key was authorized by the key management center 24 only if it was approved by all trustees 22. Thus, the government is guaranteed that, in case of a court order, it will be given all special pieces of any decryption key. By property (1), this is a guarantee that the government will be able to reconstruct any given decryption key if necessary to monitor communications over the network.

Several types of fair PKC's are now described in more detail.

Diffie and Hellman's PKC

The Diffie and Hellman public-key cryptosystem is known and is readily transformed into a fair PKC by the present invention. In the Diffie and Hellman scheme, each pair of users X and Y succeeds, without any interaction, in agreeing upon a common, secret key $S_{xy}$ to be used as a conventional single-key cryptosystem. In the ordinary Diffie-Hellman PKC, there are a prime p and a generator (or high-order element) g common to all users. User X secretly selects a random integer Sx in the interval [1, p−1] as his private key and publicly announces the integer $Px = g^{Sx} \mod p$ as his public key. Another user, Y, will similarly select Sy as his private key and announce $Py = g^{Sy} \mod p$ as his public key. The value of this key is determined as $S_{xy} = g^{Sx Sy} \mod p$. User X computes Sxy by raising Y's public key to his private key mod pX, and user Y by raising X's public key to his secret key mod p. In fact:

$$(g^{Sx})^{Sy} = g^{SxSy} = Sxy = g^{SySx} = (g^{Sy})^{Sx} \mod p.$$

While it is easy, given g, p and x, to compute $y = g^x \mod p$, no efficient algorithm is known for computing, given y and p, x such that $g^x = y \mod p$ when g has high enough order. This is the discrete logarithm problem. This problem has been used as the basis of security in many cryptosystems. The Diffie and Hellman's PKC is transformed into a fair one in the following manner.

Each user X randomly chooses 5 integers Sx1, ... Sx5 in the interval [1, p−1] and lets Sx be their sum mod p. It should be understood that all following operations are modulo p. User X then computes the numbers:

$$t1 = g^{Sx1}, \ldots, t5 = g^{Sx5} \text{ and } Px = g^{Sx}.$$

Px will be User X's public key and Sx his private key. The ti's will be referred to as the public pieces of Px, and the Sxi's as the private pieces. It should be noted that the product of the public pieces equals the public key Px. In fact:

$$t1 \ldots t5 = g^{Sx1} \ldots g^{Sx5} = g^{(Sx1 + \ldots + Sx5)} = g^{Sx}.$$

Let T1, ... T5 be the five trustees. User X now gives Px, the public pieces and Sx1 to trustee T1, Px, the public pieces and Sx2 to trustee T2, and so on. Piece Sxi is privately given to trustee Ti. Upon receiving public and private pieces ti and Sxi, trustee Ti verifies whether $g^{Sxi} = Ti$. If so, the trustee stores the pair (Px, Sxi), signs the sequence (Px,t1,t2,t3,t4,t5) and gives the signed sequence to the key management center 24 (or to user X, who will then give all of the signed public pieces at once to the key management center). Upon receiving all the signed sequences relative to a given public key Px, the key management center verifies that these sequences contain the same subsequence of public pieces t1 ... t5 and that the product of the public pieces indeed equals Px. If so, center 24 approves Px as a public key and distributes it as in the original scheme (e.g., signs it and gives it to user X). The encryption and decryption instructions for any pair of users X and Y are exactly as in the Diffie and Hellman scheme (i.e., with common, secret key Sxy).

This way of proceeding matches the previously-described way of constructing a fair PKC. A still fair version of the Diffie-Hellman scheme can be obtained in a simpler manner by having the user give to each trustee Ti just the public piece ti and its corresponding private piece Sxi, and have the user give the key management center the public key Px. The center will approve Px only if it receives all public pieces, signed by the proper trustee, and the product of these public pieces equals Px. In this way, trustee Ti can verify that Sxi is the discrete logarithm of public piece ti. Such trustee cannot quite verify that Sxi is a legitimate share of Px since the trustee has not seen Px or the other public pieces. Nonetheless, the result is a fair PKC based on the Diffie-Hellman scheme because properties (1)–(3) described above are still satisfied.

Either one of the above-described fair PKC has the same degree of privacy of communication offered by the underlying Diffie-Hellman scheme. In fact, the validation of a public key does not compromise the corresponding private key. Each trustee Ti receives, as a special piece, the discrete logarithm, Sxi, of a random number, ti. This information is clearly irrelevant for computing the discrete logarithm of Px. The same is actually true for any 4 of the trustees taken together, since any four special pieces are independent of the private decryption key Sx. Also the key management center does not possess any information relevant to the private key; i.e., the discrete logarithm of Px. All the center has are the public pieces respectively signed by the trustees. The public pieces simply are 5 random numbers whose product is Px. This type of information is irrelevant for computing the discrete logarithm of Px; in fact, any one could choose four integers at random and setting the fifth to be Px divided by the product of the first four. The result would be integral because division is modulo p. As for a trustee's signature, this just represents the promise that someone else has a secret piece.

Even the information in the hands of the center together with any four of the trustees is irrelevant for computing the private key Sx. Thus, not only is the user guaranteed that the validation procedure will not betray his private key, but he also knows that this procedure has been properly followed because it is he himself that computes his own keys and the pieces of his private one.

Second, if the key management center validates the public key Px, then its private key is guaranteed to be reconstructable by the government in case of a court order. In fact, the center receives all 5 public pieces of Px, each signed by the proper trustee. These signatures testify that trustee Ti possesses the discrete logarithm of public piece ti. Since the center verifies that the product of the public pieces equals Px, it also knows that the sum of the secret pieces in storage with the trustees equals the discrete logarithm of Px; i.e, user X's private key. Thus the center knows that, if a court order were issued requesting the private key of X, the government is guaranteed to obtain the needed private key by summing the values received by the trustees.

RSA Fair PKC

The following describes a fair PKC based on the known RSA function. In the ordinary RSA PKC, the public key consists of an integer N product of two primes and one exponent e (relatively prime with f(N), where F is Euler's quotient function). No matter what the exponent, the private key may always be chosen to be N's factorization. By way of brief background, the RSA scheme has certain characteristics that derive from aspects of number theory:

Fact 1. Let $Z_N^*$ denote the multiplicative group of the integers between 1 and N and relatively prime with N. If N is the product of two primes N=pq (or two prime powers: $N=p^a p^b$), then (1) a number s in $Z_N^*$ is a square mod N if and only if it has four distinct square-roots mod N: x, −x mod N, y, and −y mod N (i.e., $x^2=y^2=s$ mod N). Moreover, from the greatest common divisor of +−x+−y and N, one easily computes the factorization of N. Also;

(2) one in four of the numbers in $Z_N^*$ is a square mod N.

Fact 2. Among the integers in $Z_N^*$ is defined a function, the Jacobi symbol, that evaluates easily to either 1 or −1. The Jacobi symbol of x is denoted by (s/N). The Jacobi symbol is multiplicative; i.e., (x/N)(Y/N)=(x-y/N). If N is the product of two primes N=pq (or two prime powers: $N=p^a p^b$), the p and 1 are congruent to 3 mod 4. Then, if +−x and +−y are the four square roots of a square mod N (s/N)=(−x/N)=+1 and (y/N)=(−y/N)=−1. Thus, because of Fact 1, if one is given a Jacobi symbol 1 root and a Jacobi symbol −1 root of any square, he can easily factor N.

With this background, the following describes how the RSA cryptosystem can be made fair in a simple way. For simplicity again assume there are five trustees and that all of them must collaborate to reconstruct a secret key, while no four of them can even predict it. The RSA cryptosystem is easily converted into a fair PKC by efficiently sharing with the trustee's N's factorization. In particular, the trustees are privately provided information that, perhaps together with other given common information, enables one to reconstruct two (or more) square roots x and y (x different from ±y mod N) of a common square mod N. The given common information may be the −1 Jacobi symbol root of $X^2$, which is equal to y.

A user chooses P and Q primes congruent to 3 mod 4, as his private key and N=PQ as his public key. Then he chooses 5 Jacobi 1 integers $X_1, X_2, X_3, X_4$ and $X_5$ (preferably at random) in $Z_N^*$ and computes their product, X, and $X_i^2$ mod N for all i=1,...,5. The product of the last 5 squares, Z, is itself a square. One square root of Z mod N is X, which has Jacobi symbol equal to 1 (since the Jacobi symbol is multiplicative). The user computes Y, one of the Jacobi −1 roots mod N. $X_1, \ldots X_5$ will be the public pieces of public key N and the $X_i$'s the private pieces. The user gives trustee Ti private piece $X_i$ (and possibly the corresponding public piece, all other public pieces and Px, depending on whether it is desired that the verification of the shares so as to satisfy properties (1)-(3) is performed by both trustees and the center, or the trustees alone). Trustee Ti squares Xi mod N, gives the key management center his signature of $X_i^2$, and stores $X_i$.

The center first checks that (−1/N)=1, i.e., for all x: (x/N)=(−x/N). This is partial evidence that N is of the right form. Upon receiving the valid signature of the public pieces of N and the Jacobi −1 value Y from the user, the center checks whether mod N the square of Y equals the product of the five public pieces. If so, it checks, possibly with the help of the user, that N is the product of two prime powers. If so, the center approves N.

The reasoning behind the scheme is as follows. The trustees' signatures of the $X_i^2$'s (mod N) guarantee the center that every trustee Ti has stored a Jacobi symbol 1 root of $X_i^2$ mod N. Thus, in case of a court order, all these Jacobi symbol 1 roots can be retrieved. Their product, mod N, will also have Jacobi symbol 1, since this function is multiplicative, and will be a root of $X^2$ mod N. But since the center has verified that $Y^2=X^2$ mod N, one would have two roots X and Y of a common square mod N. Moreover, Y is different from X since it has different Jacobi symbol, and Y is also different from −x, since (−x/N)=(s/N) because (a) (−1/N) has been checked to be 1 and (b) the Jacobi symbol is multiplicative. Possession of such square roots, by Facts 1 and 2, is equivalent to having the factorization of N, provided that N is product of at most two prime powers. This last property has also been checked by the center before it has approved N.

Verification that N is the product of at most two prime powers can be performed in various ways. For instance, the center and user can engage in a zero-knowledge proof of this fact. Alternatively, the user may provide the center with the square root mod N for roughly ¼ of the integers in a prescribed and random enough sequence of integers. For instance, such a sequence could be determined by one-way hashing N to a short seed and then expanding it into a longer sequence using a psuedo-random generator. If a dishonest user has chosen his N to be the product of three or more prime powers, then it would be foolish for him to hope that roughly ¼ of the integers in the sequence are squares mod N. In fact, for his choice of N, at most ⅛ of the integers have square roots mod N.

Variations

The above schemes can be modified in many ways. For instance, the proof that N is product of two prime powers can be done by the trustees (in collaboration with the user), who then inform the center of their findings. Also, the scheme can be modified so that the cooperation of the majority of the trustees is sufficient for reconstructing the secret key, while any minority cannot gain any information about the secret key. Also, as with all fair cryptosystems, one can arrange that when the government asks a trustee for his piece of the secret key of a user, the trustee does not learn about the identity of the user. The variations are discussed in more detail below.

In particular, the schemes described above are robust in the sense that some trustees, accidentally or maliciously, may reveal the shares in their possession without compromising the security of the system. However, these schemes rely on the fact that the trustees will collaborate during the reconstruction stage. In fact, it was insisted that all of the shares should be needed for recovering a secret key. This requirement may be disadvantageous, either because some trustees may reveal to be untrustworthy and refuse to give the government the key in their possession, or because, despite all file backups, the trustee may have genuinely lost the information in its possession. Whatever the reason, in this circumstance the reconstruction of a secret key will be prevented. This problem is also solved by the present invention.

By way of background, "secret sharing" (with parameters n,T,t) is a prior cryptographic scheme consisting of two phases: in phase one a secret value chosen by a distinguished person, the dealer, is put in safe storage with n people or computers, the trustees, by giving each one of them a piece of information. In phase two, when the trustees pool together the information in their possession, the secret is recovered. Secret sharing has a major disadvantage—it presupposes that the dealer gives the trustees correct shares (pieces of information) about his secret value. "Verifiable Secret Sharing" (VSS) solves this "honesty" problem. In a VSS scheme, each trustee can verify that the share given to him is genuine without knowing at all the shares of other trustees of the secret itself. Specifically, the trustee can verify that, if T verified shares are revealed, the original secret will be reconstructed, no matter what the dealer or dishonest trustees might do.

The above-described fair PKC schemes are based on a properly structured, non-interactive verifiable secret sharing scheme with parameters $n=5$, $T=5$ and $t=4$. According to the present invention, it may be desirable to have different values of these parameters, e.g., $n=5$, $T=3$ and $t=2$. In such case, any majority of the trustees can recover a secret key, while no minority of trustees can predict it all. This is achieved as follows (and be simply generalized to any desired values of n, T and t in which $T>t$).

Subset Method for the Diffie-Hellman Scheme

After choosing a secret key Sx in $[1, p-1]$, user X computes his public key $Px=g^{Sx}$ mod p (with all computations below being mod p). User X now considers all triplets of numbers between 1 and 5: (1,2,3), (2,3,4) etc. For each triplet (a,b,c), user X randomly chooses three integers S1abc, ... S3abc in the interval $[1, p-1]$ so that their sum mod p equals Sx. Then he computes the numbers:

$$t1abc=g^{S1abc}, t2abc=g^{S2abc}, t3abc=g^{S3abc}$$

The tiabc's will be referred to as public pieces of Px, and the Siabc's as private pieces. Again, the product of the public pieces equals the public key Px. In fact, $$t1abc \cdot t2abc \cdot t3abc = g^{S1abc} \cdot g^{S2abc} \cdot g^{S3abc} = g^{(S1abc+\ldots+S3abc)} = g^{Sx} = Px$$

User X then gives trustee Ta t1abc and S1abc, trustee Tb t2abc and S2abc, and trustee Tc t3abc and S3abc, always specifying the triplet in question. Upon receiving these quantities, trustee Ta (all other trustees do something similar) verifies that $t1abc=g^{S1abc}$, signs the value (Px, t1abc, (a,b,c)) and gives the signature to the management center.

The key management center, for each triple (a,b,c), retrieves the values t1abc, t2abc and t3abc from the signed information received from trustees, Ta, Tb and Tc. If the product of these three values equals Px and the signatures are valid, the center approves Px as a public key.

The reason the scheme works, assuming that at most 2 trustees are untrustworthy, is that all secret pieces of a triple are needed for computing (or predicting) a secret key. Thus no secret key in the system can be retrieved by any 2 trustees. On the other hand, after a court order at least three trustees reveal all the secret pieces in their possession about a given public key. The government then has all the necessary secret pieces for at least one triple, and thus can compute easily the desired secret key.

Alternatively, each trustee is replaced by a group of new trustees. For instance, instead of a single trustee Ta, there may be three trustees: Ta1, Ta2 and Ta3. Each of these trustees will receive and check the same share of trustee Ta. In this way it is very unlikely that all three trustees will refuse to surrender their copy of the first share.

After having insured that a few potentially malicious trustees cannot prevent reconstruction of the key, there are still further security issues to address, namely, a trustee—requested by a court order to surrender his share of a given secret key—may alert the owner of that key that his communications are about to be monitored. This problem is also solved by the invention. A simple solution arises if the cryptosystem used by the trustees possess certain algebraic properties. This is illustrated for the Diffie-Hellman case, though the same result occurs for the RSA scheme. In the following discussion, for simplicity it is assumed that all trustees collaborate in the reconstruction of the secret key.

Oblivious and Fair Diffie-Hellman Scheme

Assume that all trustees use deterministic RSA for receiving private messages. Thus, let Ni be the public RSA modulus of trustee Ti and ei his encryption exponent (i.e., to send Ti a message m in encrypted form, one would send $m^{ei}$ mod Ni).

User U prepares his public and secret key, respectively Px and Sx (thus $Px=g^{Sx}$ mod p), as well as his public and secret pieces of the secret key, respectively ti and Sxi's (thus $Px=t1, t2 \ldots t5$ mod p and $ti=g^{Sxi}$ mod p for all i). Then, the user gives to the key management center Px, all of the ti's and the n values $Ui=(Sxi)^3$ mod Ni; i.e., he encrypts the i-th share with the public key of trustee Ti. Since the center does not know the factorization of the Ni's, this is not useful information to predict Sx, nor can the center verify that the decryption of the n ciphertexts are proper shares of Sx. For this, the center will seek the cooperation of the n trustees, but without informing them of the identity of the user as will be described.

The center stores the values tj's and Uj's relative to user U and then forwards Ui and ti to trustee Ti. If every trustee Ti verified that the decryption of Ui is a proper private piece relative to ti, the center approves Px.

Assume now that the judicial authority decides to monitor user U's communications. To lawfully reconstruct secret key Sx without leaking to a trustee the identity of the suspected user U, a judge (or another authorized representative) randomly selects a number Ri mod Ni and computes yi=Ri $^{ei}$ mod Ni. Then, he sends trustee Ti the value zi=Ui·yi mod Ni, asking with a court order to compute and send back wi, the ei-th root of zi mod Ni. Since zi is a random number mod Ni, no matter what the value of Ui is, trustee Ti cannot guess the identity of the user U in question. Moreover, since zi is the product of Ui and yi mod Ni, the ei-th root of zi is the product mod Ni of the ei-th root of Ui (i.e., Sxi) and the ei-th root of yi (i.e., Ri). Thus, upon receiving wi, the judge divides it by yi mod Ni, thereby computing the desired Sxi. The product of these Sxi's equals the desired Sx.

Further variation

In other variations of the invention, in case of a court order, the government is only authorized to understand the messages concerning a given user for a limited amount of time. The collective approval of all trustees may stand for the government approval. Also, trustees need not store their piece of the private key. The encryption of this piece—in the trustee's public key and signed by the trustee—can be made part of the user's public key. In this way, the public key carries the proof of its own authenticity and verification. In the latter case it may be advantageous to break the trustee's private keys into pieces.

If the user is an electronic device, such as an integrated circuit chip, the basic process of key selection and public-key validation can be done before the device leaves the factory. In this case, it may be advantageous that a "copy" of the trustee can be maintained within the factory. A copy of a trustee is a physically secure chip—one whose data cannot be read—containing a copy of the trustee's decryption key. The trustee (i.e., the party capable of giving the piece of a private key under a court order) need not necessarily coincide with this device.

In another variation, it may be arranged that the trustees each a have piece of the government private key, and that each user's private key is encrypted with the public key of the government.

While the use of a fair PKC in a telecommunications network (and under the authority of the government) has been described, such description is not meant to be taken by way of limitation. A fair PKC can be used in private organizations as well. For example, in a large organization where there is a need for privacy, assume there is an established "superior" but not all employees can be trusted since there are too many of them. The need for privacy requires the use of encryption. Because not all employees can be trusted, using a single encryption key for the whole company is unacceptable, as is using a number of single-key cryptosystems (since this would generate enormous key-distribution problems). Having each employee use his own double-key system is also dangerous, since he or she might conspire against the company with great secrecy, impunity and convenience.

In such application of a fair PKC, numerous advantages are obtained. First, each employee is in charge of choosing his own keys. While enjoying the advantages of a more distributed procedure, the organization retains absolute control because the superior is guaranteed to be able to decrypt every employee's communications when necessary. There is no need to change keys when the superior changes because the trustees need not be changed. The trustees' storage places need less surveillance, since only compromising all of them will give an adversary any advantage.

For making fair a private key cryptosystem, but also for a PKC, it is desirable that each trustee first deposits an encrypted version or otherwise committed version of his share, so that, when he is asked to reveal what his share was, he cannot change his mind about its value. Also, it is desirable that the user gives his shares to the trustees signed; such signatures can be relative to a different public key (if they are digital signatures) or to the same new public key if the new key can be used for signing as well. In this way, the share revealed by the trustee clearly proves that it way originated. Better still, the user may sign (with the trustee's key) the encryption of the share given to a trustee, and the signature can be revealed together with the share. This approach insures that one can both be certain that what was revealed was a share approved by the user and also that the trustees and the user cannot collaborate later on in changing its value.

It should be appreciated by those skilled in the art that the specific embodiments disclosed above may be readily utilized as a basis for modifying or designing other techniques and processes for carrying out the same purposes of the present invention. It should also be realized by those skilled in the art that such equivalent constructions do not depart from the spirit and scope of the invention as set forth in the appended claims.

What is claimed is:

1. A method, using a public-key cryptosystem, for enabling a predetermined entity to monitor communications of users suspected of unlawful activities while protecting the privacy of law-abiding users, wherein each user is assigned a pair of matching secret and public keys, comprising the steps of:
   breaking each user's secret key into shares;
   providing trustees pieces of information enabling the trustees to verify that the pieces of information include shares of a secret key of some given public key; and
   upon a predetermined request, having the trustees reveal the shares of the secret key of a user suspected of unlawful activity to enable the entity to attempt reconstruction of the secret key for monitoring communications to the suspect user.

2. The method as described in claim 1 wherein the predetermined entity is a government agency and the predetermined request is a court order.

3. The method as described in claim 1 wherein the identity of the suspect user is known to the trustees.

4. The method as described in claim 1 wherein the identity of the suspect user is unknown to the trustees.

5. The method as described in claim 1 further including the step of:
   characterizing the suspect user's activities as unlawful if the entity is unable to monitor the suspect user's communications.

6. The method as described in claim 1 wherein less than all of the shares of the suspect user's secret key are required to be revealed in order to reconstruct the secret key.

7. The method as described in claim 1 wherein the shares are revealed to the entity upon the predetermined request.

8. The method as described in claim 1 wherein a given minority of trustees are unable to reconstruct the secret key.

9. The method as described in claim 1 wherein each trustee can verify that the pieces of information provided include a share of the secret key without interaction with any other trustee.

10. A method, using a public-key cryptosystem, for enabling a predetermined entity to monitor communications of users suspected of unlawful activities while protecting the privacy of law-abiding users, wherein each user is assigned a pair of matching secret and public keys, comprising the steps of:

breaking each user's secret key into shares;

providing trustees pieces of information that include shares of a secret key of some give public key; and upon a predetermined request, having the trustees reveal the shares of the secret key of a user suspected of unlawful activity to enable the entity to reconstruct the secret key and monitor communications to the suspect user.

11. A method, using a public-key cryptosystem into a cryptosystem, for enabling a predetermined entity to monitor communications of users suspected of unlawful activities while protecting the privacy of law-abiding users, comprising the step of:

verifying secret sharing each user's secret key with a plurality of trustees so that each trustee can verify that the share received is part of a secret key of some public key.

12. The method as described in claim 11 further including the step of:

characterizing the suspect user's activities as unlawful if the entity is unable to monitor the suspect user's communications.

13. The method as described in claim 11 wherein a given minority of trustees are unable to reconstruct the secret key.

14. The method as described in claim 11 wherein each trustee can verify that the pieces of information provided include a share of the secret key without interaction with any other trustee.

15. A method, using a cryptosystem, for enabling a predetermined entity to monitor communications of users suspected of unlawful activities while protecting the privacy of law-abiding users, wherein a group of users has a secret key, comprising the steps of:

breaking the secret key into shares;

providing trustees pieces of information that include shares of the secret key; and upon a predetermined request, having the trustees reveal the shares of the secret key of a user suspected of unlawful activity to enable the entity to reconstruct the secret key and monitor communications to the suspect user.

16. The method as described in claim 15 further including the step of:

characterizing the suspect user's activities as unlawful if the entity is unable to monitor the suspect user's communications.

17. The method as described in claim 15 wherein a given minority of trustees are unable to reconstruct the secret key.

18. The method as described in claim 15 wherein each trustee can verify that the pieces of information provided include a share of the secret key without interaction with any other trustee.

* * * * *

REEXAMINATION CERTIFICATE (2673rd)
United States Patent [19]
Micali

[11] B1 5,276,737
[45] Certificate Issued Sep. 12, 1995

[54] FAIR CRYPTOSYSTEMS AND METHODS OF USE

[75] Inventor: Silvio Micali, 224 Upland Rd., Cambridge, Mass. 02140

[73] Assignee: Silvio Micali, Cambridge, Mass.

Reexamination Request:
No. 90/003,532, Aug. 16, 1994

Reexamination Certificate for:
Patent No.: 5,276,737
Issued: Jan. 4, 1994
Appl. No.: 870,935
Filed: Apr. 20, 1992

[51] Int. Cl.$^6$ ............................................. H04K 1/00
[52] U.S. Cl. ........................................ 380/30; 380/23; 380/25
[58] Field of Search ........................ 380/23, 24, 25, 28, 380/30, 48

[56] References Cited

U.S. PATENT DOCUMENTS

| | | | |
|---|---|---|---|
| 4,908,861 | 3/1990 | Brachtl et al. | 380/25 |
| 4,924,514 | 5/1990 | Matyas et al. | 380/24 |
| 4,965,827 | 10/1990 | McDonald | 380/25 |
| 5,081,676 | 1/1992 | Chou et al. | 380/4 |
| 5,177,791 | 1/1993 | Yeh et al. | 380/45 |
| 5,208,853 | 5/1993 | Armbruster et al. | 380/4 |
| 5,214,698 | 5/1993 | Smith, Sr. et al. | 380/21 |

OTHER PUBLICATIONS

"On Secret Sharing Systems," Karnin et al., IEEE, Transactions on Information Theory, vol. II-29, No. 1, Jan. 82, pp. 35–.

"Secret Sharing Scheme Realizing General Access Structure," Mitsuro Ito et al., IEEE 1987, pp. 3.6.1–3.6.4.

"Generalized Secret Sharing and Monotone Functions," Benaloh et al., Advances in Cryptology–Crypto '88. pp. 27–35.

"Multiparty Protocols Tolerating Half Faulty Processors," Beaver, Advances in Cryptology–Crypto '89, pp. 560–572.

"Securely Replicating Authentication Services," Li Gong, IEEE, 1989, pp. 85–91.

"On Computationally Secure Authentication Tags Requiring Short Secret Shared Keys," Brassard, Advances in Cryptology–Crypto '82. pp. 79–86.

"Verifiable Secret Sharing and Achieving Simultaneity in the Presence of Faults," Micali et al., IEEE, 1985, pp. 383–395.

"Verifiable Secret Sharing and Multiparty Protcols With Honest Majority," Rabin et al, ACM, 1989, pp. 73–85.

"Cryptography: A New Dimension in Computer Data Security," Meyer et al., John Wiley & Sons, 1982, pp. 350–351, 354–359, 468–469, 535, 541.

"Crypto Users' Handbook," Christoffersson, Elsevier Science Publishers, 1988, pp. 8–17, 20–21, 39, 42–47, 66–67, 72–77, 80–85.

"Data & Computer Security," Longley et al., Stockton Press, 1987, pp. 10–13, 26–27, 183–185, 189–191, 216–219, 274–275, 323, 356–357, 380–381, 420–421.

*Primary Examiner*—Tod R. Swann

[57] ABSTRACT

A method, using a public-key cryptosystem, for enabling a predetermined entity to monitor communications of users suspected of unlawful activities while protecting the privacy of law-abiding users, wherein each user is assigned a pair of matching secret and public keys. According to the method, each user's secret key is broken into shares. Then, each user provides a plurality of "trustees" pieces of information. The pieces of information provided to each trustee enable that trustee to verify that such information includes a "share" of a secret key of some given public key. Each trustee can verify that the pieces of information provided include a share of the secret key without interaction with any other trustee or by sending messages to the user. Upon a predetermined request or condition, e.g., a court order authorizing the entity to monitor the communications of a user suspected of unlawful activity, the trustees reveal to the entity the shares of the secret key of such user. This enables the entity to reconstruct the secret key and monitor the suspect user's communications.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–9 is confirmed.

Claims 10–11 and 15 are determined to be patentable as amended.

Claims 12–14 and 16–18, dependent on an amended claim, are determined to be patentable.

10. A method, using a public-key cryptosystem, for enabling a predetermined entity to monitor communications of users suspected of unlawful activities while protecting the privacy of law-abiding users, wherein each user is assigned a pair of matching secret and public keys, comprising the steps of:

breaking each user's secret key into shares;
　providing trustees pieces of information that include shares of a secret key of some give public key, *trustees being distinct from the predetermined entity;* and
　upon a predetermined request, having the trustees reveal the shares of the secret key of a user suspected of unlawful activity to enable the entity to reconstruct the secret key and monitor communications to the suspect user.

11. A method, using a public key cryptosystem [into a cryptosystem], for enabling a predetermined entity to monitor communications of users suspected of unlawful activities while protecting the privacy of law-abiding users, comprising the steps of:

[verifying] *verifiably* secret sharing each user's secret key with a plurality of trustees so that each trustee can verify that the share received is part of a secret key of some public key;
　*upon a predetermined request, having at least some of the trustees reveal the shares of the secret key of a user suspected of unlawful activity to enable the entity to reconstruct the secret key and monitor communications to the suspect user.*

15. A method, using a cryptosystem, for enabling a predetermined entity to monitor communications of users suspected of unlawful activities while protecting the privacy of law-abiding users, wherein a group of users has a secret key, comprising the steps of:

breaking the secret key into shares;
　providing trustees pieces of information that include shares of the secret key, *trustees being distinct from the predetermined entity;* and
　upon a predetermined request, having the trustees reveal the shares of the secret key of a user suspected of unlawful activity to enable the entity to reconstruct the secret key and monitor communications to the suspect user.

* * * * *